Sept. 12, 1961    J. H. LATZEN    2,999,710
BALL JOINT, ESPECIALLY FOR MOTOR VEHICLES
Filed Sept. 5, 1957

INVENTOR.
JOSEF H. LATZEN, DECEASED
BY ANNELIESE LATZEN, SOLE HEIR.
BY
Patent Agent United States Patent Office 2,999,710
Patented Sept. 12, 1961

2,999,710
BALL JOINT, ESPECIALLY FOR MOTOR VEHICLES
Josef H. Latzen, deceased, late of Strump-Osterrath, near Dusseldorf, Germany, by Anneliese Latzen, nee Dahmen, heir, Strump, near Osterrath near Dusseldorf, Germany, assignor to A. Ehrenreich & Cie, Dusseldorf-Oberkassel, Germany
Filed Sept. 5, 1957, Ser. No. 682,198
Claims priority, application Germany Sept. 8, 1956
4 Claims. (Cl. 287—90)

The present invention relates to a ball-shaped suspension for the suspension of the wheels of a motor vehicle. The present invention, although not limited to, is particularly directed to suspension joints in which the load rests on the upper half of the ball head.

It is an object of the present invention to provide a ball-shaped suspension joint of the above character in which the various movements, i.e. the movements in different planes, are taken up by different parts.

It is a further object of this invention to provide a suspension joint of the type set forth in the preceding paragraph, which will make it possible particularly easily and effectively to lubricate the respective parts of the joint.

These and other objects and advantages of the invention will appear more clearly from the following specification in connection with the accompanying drawings in which.

Figure 1:
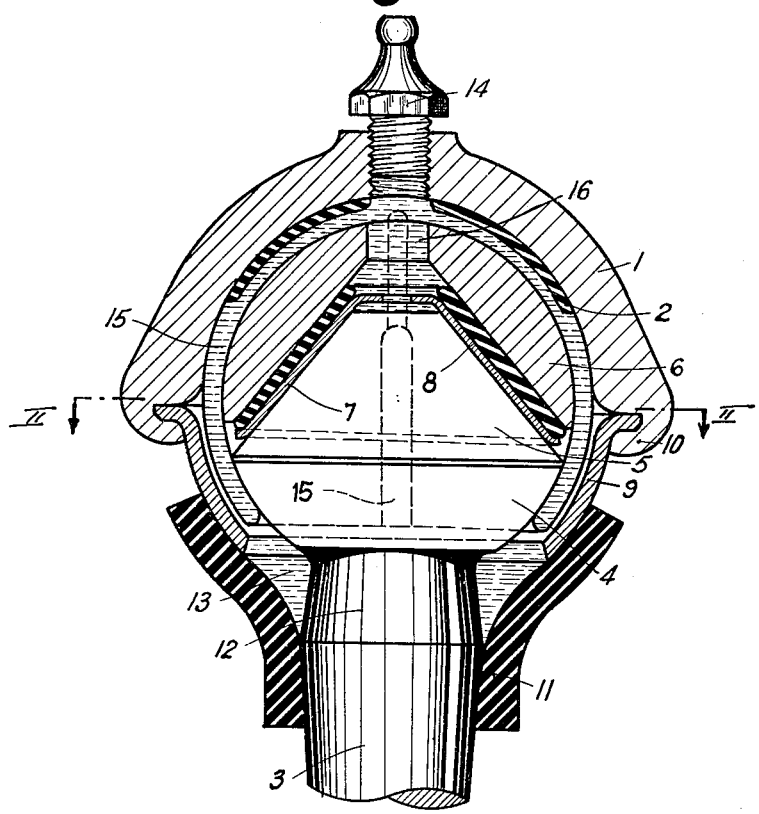
FIG. 1 is a vertical section through a suspension joint according to the present invention.

In order to provide a joint, the different movements of which will be taken up by different elements of the joint, according to the present invention, the upper portion of the ball head of the upward-standing ball stud is cone-shaped and is provided with a ball-shaped cap. As a result thereof, the rotative movement of the ball head about its axis is taken up by the cone-shaped surface of the head, whereas the oscillatory movement of the head about the center of the ball-shaped surfaces is conveyed by the ball shaped parts. In this way, two different planes of movement are obtained which can easily be lubricated.

Referring now to the drawing in detail, the suspension joint illustrated therein comprises a housing 1 having arranged therein the ball cup 2 provided with grooves 15, which grooves make possible a resilient spreading of the ball cup 2 for purposes of installing the inner parts in the cup. The cup 2 may, if desired, extend up to the central portion of the joint.

The ball stud 3 extends from below into the housing. This stud has a spherical portion 4 arranged above the neck 12 of the stud 3, whereas the upper part 5 is cone-shaped. Above said cone-shaped part 5 is provided a cap 6 having a ball-shaped outer contour and being arranged in cup 2. Provided on the cone-shaped part 5 is a cone-shaped cap 7, the inner surface of which forms the running surface when the ball stud 3 rotates about its central axis. If desired, between said cone-shaped cap 7 and the ball-shaped cap 6 there may be interposed an elastic insert 8 of any suitable elastic material such as, for instance polyurethan or polyamid.

The cup 2 and the caps 6 and 7 may consist of any suitable material such as steel, bronze, and synthetic material. In this way, when selecting a suitable material for the cups and caps, a favorable condition will be obtained with regard to friction and wear.

The lower portion of the housing 1 is formed by a closure cap 9 which may be held in position by a corresponding flange 10 of the housing 1, or in any other convenient manner. In a manner known per se, a sleeve 11 is mounted on the ball stud 3 so that a lubricating chamber 13 is formed between the lower marginal portion of the housing and the neck 12 of the stud 3.

The upper end of the housing 1 is provided with a lubricating nipple 14 through which lubricant is pressed into the grooves 15 of the ball cup 2. The lubricant will be able to pass over the entire ball cup downwardly into the lubricating chamber 13.

Figure 2:
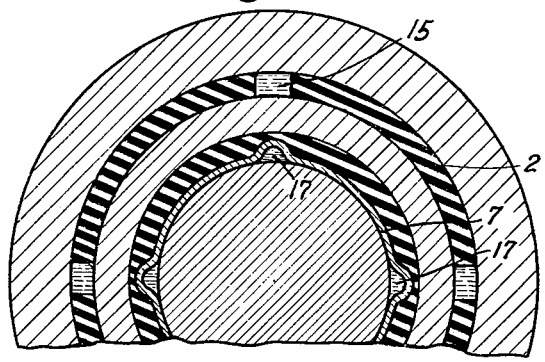
FIG. 2 is a horizontal section through the joint of FIG. 1, said section being taken along the line II—II of FIG. 1.

The ball-shaped cap 6 is provided with a central bore 16 so that the lubricant can also pass through the running surface between the cone-shaped head 5 and the cone-shaped cap 7. This cap 7 is provided with, preferably, pressed-in lubricating grooves 17 which are advantageously formed by pressing the cone-shaped cap 7, as is clearly evident from FIG. 2. The lower ends of said lubricating grooves 17 lead into the lower part of the lubricating grooves 15. In this way, a particularly effective lubrication of all running surfaces of the joint will be obtained.

It is, of course, to be understood that the present invention is, by no means, limited to the particular construction shown in the drawing, but also comprises any modifications within the scope of the appended claims.

What is claimed is:

1. In a ball-shaped suspension joint for the suspension of the wheels of a motor vehicle: a stud, a head connected to said stud and having a spherical surface portion adjacent said stud and a cone-shaped surface portion integral with said spherical surface portion and remote from said stud, a cap arranged above said cone-shaped surface portion and having an outer spherical surface and an inner cone-shaped surface corresponding to the outer contour of said cone-shaped surface portion, said cap being rotatably supported by said cone-shaped surface portion and being rotatable about the extension of the longitudinal axis of said stud, said outer spherical surface portion supplementing said spherical surface portion of said head to form a spherical surface of a nearly complete ball, and a socket member embracing said cap and said head.

2. In a ball-shaped suspension joint for the suspension of the wheels of a motor vehicle: a stud; a head connected to said stud and having a spherical surface portion adjacent said stud and a cone-shaped surface portion integral with said spherical surface portion and remote from said stud; a hollow cone-shaped member mounted upon said cone-shaped portion; a conical member of elastic material mounted on said hollow cone-shaped surface member; a cap having an outer spherical surface and an inner cone-shaped surface engaging said conical member; said outer spherical surface portion supplementing said spherical surface portion of said head to a spherical surface of a nearly complete ball and a socket member embracing said cap and said conical member and also said hollow cone-shaped member and said head.

3. A suspension joint according to claim 2, in which said hollow cone-shaped member is provided with pressed-in lubricating grooves.

4. In a ball-shaped suspension joint for the suspension of the wheels of a motor vehicle: a stud; a head connected to said stud and having a spherical surface portion adjacent said stud and a cone-shaped surface portion integral with said spherical surface portion and remote from said stud; a hollow cone-shaped member mounted upon said cone-shaped portion; a conical member of elastic material mounted on said hollow cone-shaped member; a cap having an outer spherical surface portion and an inner cone-shaped surface portion engaging said conical member; said outer spherical surface portion supplementing said spherical surface portion of said head to a spherical surface of a nearly complete ball and a socket member provided with lubricating passages leading to said cap, whereby in addition to conveying lubricating means to said cap said socket member has a certain resiliency.

References Cited in the file of this patent

UNITED STATES PATENTS

| | | |
|---|---|---|
| 1,300,023 | Riegel | Apr. 8, 1919 |
| 2,108,814 | Flumerfelt | Feb. 22, 1938 |
| 2,455,343 | Slack et al. | Nov. 30, 1948 |
| 2,461,866 | Alldredge | Feb. 15, 1949 |
| 2,614,873 | Booth | Oct. 21, 1952 |
| 2,727,768 | Latzen | Dec. 20, 1955 |
| 2,819,918 | Seaquist | Jan. 14, 1958 |
| 2,857,190 | Moskovitz | Oct. 21, 1958 |

FOREIGN PATENTS

| | | |
|---|---|---|
| 347,514 | Germany | Aug. 31, 1920 |